United States Patent Office 2,918,494
Patented Dec. 22, 1959

2,918,494

PRODUCTION OF ORGANOMETALLIC COMPOUNDS

Rex D. Closson, Northville, Mich., and David O. De Pree, Baton Rouge, La., assignors to Ethyl Corporation, New York, N.Y., a corporation of Delaware No Drawing. Application August 3, 1959
Serial No. 831,007

11 Claims. (Cl. 260—541)

This invention relates to the production of novel organo-metallic compounds and in particular is concerned with the preparation of organometallic compounds in which the α-carbon atom of a metal salt of an organic acid is substituted with a metal. This application is a continuation-in-part of prior copending patent application Serial No. 739,655, filed June 4, 1958, now abandoned, and prior patent applications Serial Nos. 438,358 and 713,796, filed June 21, 1954 and February 7, 1958, respectively, both now abandoned.

The prior art discloses processes for the preparation of α-metallic substituted organic salts. In general, these processes involve the consumption of two equivalents of metal for each equivalent of the α-metallo-metallic salt of an organic acid produced. For example, α-sodio-sodium caproate is described as being formed when reacting sodium caproate concurrently with sodium and benzene and passing amyl chloride through the reaction mixture. Thus, the sodium reacts with the amyl chloride in situ to produce amyl sodium and sodium chloride thereby consuming two equivalents of sodium. The amyl sodium then reacts with the sodium caproate to produce α-sodio-sodium caproate. In addition, the processes taught in the art result in the formation of other organometallic compounds which hinder the separation of the α-metallo-metallic compounds and because of these impurities limits their usage since these foreign compounds undergo competing reactions encompassing a complexity of undesirable side reactions difficult to control.

It is an object of this invention to provide a new process. A particular object is to provide a process for the preparation of metallic substituted metal salts of organic acids, particularly α-sodio-sodium acetate, in high yields and purity.

The above and other objects of this invention are accomplished by reacting a metal salt of an organic acid with a metal compound selected from the group consisting of metal hydrides, metal amides and derivatives of metal amides. It is preferred to react a metal amide or derivative thereof with a metal salt of an organic acid having at least one α-hydrogen atom. Thus, compounds having the formula (I)
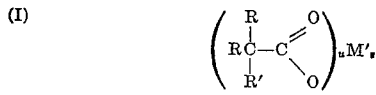

wherein R and R' can be the same or different and are selected from the group consisting of hydrogen and organic radicals, M' is a monovalent or polyvalent metallic ion, and $u$ and $v$ can be the same or different and are small whole numbers, are reacted with a compound having the formula (II)

wherein M can be the same as or different than M' and is also a monovalent or polyvalent metallic ion, $a$ and $b$ can be the same or different and are selected from the group consisting of hydrogen and lower alkyl radicals and $w$ is a small whole number. Likewise, the reactants depicted by formula I can be reacted with metal hydrides wherein the metallic substituent has the same definition as M, set forth hereinbefore. The products obtained by the process of this invention can be depicted by the formula (III)
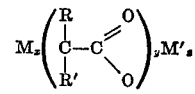

wherein M, R, R', and M' have the meaning hereinbefore defined and $x$, $y$, and $z$ can be the same or different and are small whole numbers. The products obtained by our process are characterized as being essentially free of other organometallic compounds.

Thus, within the scope of this invention, and one embodiment thereof, is a process which comprises reacting a metal salt of a carboxylic acid having at least one α-hydrogen atom with a compound selected from the group consisting of hydrides, amides, and lower alkyl amides of a metal selected from the class consisting of alkali and alkaline earth metal, (1) at a pressure not substantially greater than atmospheric and a temperature within about 40° C. of the melting point of the lower melting reactant when said amides and lower alkyl amides are employed, and, (2) when said hydrides are employed, said process being conducted at a temperature up to about 260° C. Generally, it is preferred to employ a temperature between about 170 and 250° C. when a metal amide is employed. When a metal hydride is employed it is preferred to conduct the process at a temperature between about 180 and 260° C. Furthermore, it is preferred to employ an alkali or alkaline earth metal salt of said carboxylic acid having at least one α-hydrogen atom.

In a preferred embodiment, the metal salts of organic acids are reacted with alkali metal hydrides, alkali metal amides or derivatives of alkali metal amides. In general, the temperatures most preferred are within about 40° C. of the melting point of the lower melting reactant. However, in some cases, especially when a metallic hydride is employed as a reactant, it is desirable to operate at temperatures approaching the decomposition temperature of the product—that is, between the decomposition temperature of the product and 20° C. less than said decomposition temperature. It is also preferable to employ essentially stoichiometric quantities of the reactants. Likewise, the reactants should be substantially anhydrous and preferable of a small particle size. Further, the starting materials should be essentially free of organometallic compounds, or compounds that would form organometallic compounds, other than the products desired. In one embodiment, a pre-mix of the reactants is prepared. This pre-mix is fed continuously to a heated surface blanketed by an inert atmosphere, volatile by-products are continuously removed and the solid product is recovered from the heated surface.

Also within the scope of this invention and constituting another preferred embodiment thereof is a process which comprises reacting a metal salt of a carboxylic acid having at least one α-hydrogen atom, with a metal amide of a metal selected from the class consisting of alkali and alkaline earth metals, at a pressure not substantially greater than atmospheric and a temperature between about 170 and 250° C., the metal substituent of said metal salt of a carboxylic acid being selected from the group consisting of alkali and alkaline earth metals. The metal amide which is preferred is sodium amide.

When a metal hydride is employed, it is preferred to react a metal salt of a carboxylic acid having at least one α-hydrogen atom with a metal hydride of a metal selected from the class consisting of alkali and alkaline earth metals at a pressure between about atmospheric and 333 atmospheres and a temperature between about 180° and 260° C. The metal substituent of said metal salt of a carboxylic acid is selected from the class consisting of alkali and alkaline earth metals. The metal hydride which is preferably employed is sodium hydride.

A particular advantage to our process is that the products are obtained substantially in their pure form in high yield. The purity of the product obtained is important since its separation from other compounds is quite difficult. In particular, the product is obtained substantially free of other organometallic compounds from which it cannot be conveniently separated. If other organometallic compounds were present as, for example, amyl sodium, these materials would react competitively with the metallo-metallic organic acid salt in any of its applications. Another particular advantage of the process of this invention is that the metallo-metallic organo acid salts are prepared utilizing one mole of sodium per mole of product, whereas the prior art processes require two moles of sodium per mole of product as has been pointed out above.

To demonstrate the process of this invention and the products obtained thereby, the following examples are presented wherein all portions are parts by weight unless otherwise specified.

*Example I*

To a container flushed with nitrogen was added 7.8 parts of finely divided sodium amide and 24.6 parts of finely divided anhydrous sodium acetate. The mixture was agitated in order to obtain a uniform distribution of particles. From the container the mixture was fed intermittently over a period of one hour to a reaction vessel previously heated to a temperature of about 180° C., and also flushed with nitrogen. The reaction vessel was equipped with means for agitation and inlet and outlet ports. The feed to the vessel was such that the temperature could be maintained between 180 and 235° C. The reaction mixture was continuously agitated. The ammonia evolved was absorbed in a 2 N solution of hydrogen chloride. At the completion of the addition to the reactor, the ammonia evolution had essentially ceased and the heat was removed. The product, α-sodio-sodium acetate, free of other organometallic compounds, remained in the reaction vessel and was recovered therefrom. Titration of the hydrogen chloride solution indicated a yield of product of 89.5 percent based upon sodium amide.

*Example II*

This run was conducted essentially the same as that described above wherein the same quantity of sodium amide was employed, 40 parts of sodium acetate were employed, and the temperature varied between 173 to 240° C. The total reaction time was 40 minutes. Determination of the amount of ammonia absorbed in the hydrogen chloride solution indicated a yield of α-sodio-sodium acetate of greater than 99 percent based upon sodium amide. The product remaining in the reaction vessel was white and did not decompose upon heating to 375° C.

The following working example illustrates a process for the preparation of α-sodio-sodium acetate which comprises reacting sodium acetate with sodium amide in essentially stoichiometric amounts at a temperature between about 178 and 220° C. and a pressure not substantially greater than atmospheric.

*Example III*

This run was conducted essentially the same as described in Example I, except that 19.5 parts of sodium amide and 41 parts of sodium acetate were employed. The agitator in this instance was one which would also afford grinding during the reaction. The particles of sodium amide and sodium acetate were fed separately to the reactor and during the reaction, the temperature was maintained between 178 and 220° C. By this technique, the yield obtained of α-sodio-sodium acetate was greater than 90 percent.

*Example IV*

Alpha-sodio-sodium phenyl acetate was prepared when reacting sodium phenyl acetate with sodium amide essentially the same as described above in Example III.

*Example V*

Alpha-sodio-sodium vinyl acetate was prepared by reacting sodium vinyl acetate with sodium amide essentially as described above in Example III.

As pointed out hereinabove, the process of the instant invention can be conducted utilizing a metal hydride in addition to a metallic amide or derivative of a metallic amide. It is especially preferred to employ an alkali or alkaline earth metal hydride. The following examples illustrate this embodiment of the instant invention.

In Example VI a process for the preparation of α-sodio-sodium acetate which comprises reacting sodium acetate with sodium hydride in essentially stoichiometric amounts, at a temperature between about 215 and 239° C. and a pressure not substantially greater than atomspheric is illustrated.

*Example VI*

To the container flushed with nitrogen was added 10 parts of sodium metal in slices along with 20 to 30 parts of sodium chloride and the container was then heated to 200° C. Hydrogen was flushed through the system with stirring and thereafter the nitrogen was discontinued whereupon the temperature was allowed to run between 200 and 300° C. under hydrogen flush for 3 hours. Thereupon the system was cooled to 200° C. whereupon free hydrogen was removed from the system. Thereafter 35.28 parts of anhydrous sodium acetate was added to the reaction mass. The mixture was stirred and the temperature maintained between 215° C. and 239° C. during the reaction period. At the completion of the addition hydrogen evolution had essentially ceased and the heat was removed. The product α-sodio-sodium acetate, free from other organometallic compounds, remained in the reaction vessel and was recovered therefrom. A 43.9 percent product yield based on the conversion of sodium acetate was obtained.

*Example VII*

A reaction vessel was provided with means for heating, stirring and continuous addition. To the reaction vessel was added 200 grams of dry sodium chloride whereupon the temperature on the system was brought to 200° C. with stirring under a nitrogen blanket. The temperature was then cooled to 110° C. and 25 parts of sliced sodium metal was added with stirring. The system was again heated to 200° C. whereupon a hydrogen flush replaced the nitrogen purge. Hydrogen was taken up rapidly for a 2 hour period whereupon the take up slacked off. Hydrogenation was continued for another half hour and the system then placed under a nitrogen purge. The system was maintained at 200° C. Thereafter 90.4 parts of sodium acetate was added under nitrogen with stirring. After discontinuance of the nitrogen purge a steady strong evolution of gas was observed and the temperature of the reaction was brought to 260° C. where it remained until the end of the reaction. The product α-sodio-sodium acetate remained in the reaction vessel. Substantial yields of the desired product were obtained.

Example VIII

This run is conducted essentially the same as described in Example VI, except that 24 parts of sodium hydride and 158 parts of sodium phenyl acetate are employed to produce α-sodio-sodium phenyl acetate.

Example IX

Apha-sodio-sodium vinyl acetate is prepared by reacting sodium vinyl acetate with sodium hydride essentially as described above in Example VI.

Example X

The procedure of Example VI is substantially employed with the exception that the reaction between the sodium hydride and the sodium acetate is conducted at a temperature of approximately 180° C. to produce the α-sodio-sodium acetate.

Example XI

Substantially the same procedure as that employed in Example VI is followed with the exception that upon completion of the addition of the sodium acetate to the reaction vessel, the temperature on the system is maintained at approximately 260° C. for a period of one hour thereby producing the desired α-sodio-sodium acetate.

Example XII

The procedure of Example VI is repeated with the exception that the pressure during the course of the reaction is maintained at about 333 atmospheres. The product, α-sodio-sodium acetate, is recovered in good yield.

Although the above examples demonstrate our process when employing sodium acetate, sodium phenyl acetate, and sodium vinyl acetate, other starting materials can be employed with equal results. For example, referring to Formula I above, R and R' can be the same or different and are selected from the group consisting of hydrogen and monovalent organic radicals. The term "monovalent organic radical" denotes a univalent, aliphatic, alicyclic, or aromatic radical which can be further substituted. By the term "univalent aliphatic" is intended a univalent radical derived from an open chain saturated or unsaturated carbon compound. The term "univalent alicyclic radical" denotes a univalent radical derived from the corresponding aliphatic compounds by ring formation.

Thus, when the substituents, R and R' are univalent, aliphatic radicals, they can be radicals such as the alkyl radicals, methyl, ethyl, isopropyl, n-butyl, isobutyl, tertiary butyl, n-amyl, and various positional isomers such as, for example, 2-methylbutyl; 1,2-dimethylpropyl; and 1-ethylpropyl, and likewise, the corresponding straight or branched chain isomers of hexyl, heptyl, octyl, and the like up to and including about eicosyl. Moreover, such monovalent aliphatic radicals can be alkenyl radicals such as, for example, ethenyl, $\Delta^1$-propenyl, isopropenyl, $\Delta^2$-butenyl, $\Delta^3$-butenyl, and the corresponding branched chain isomers thereof, and other alkenyl radicals such as hexenyl, heptenyl, octenyl, up to and including eicosenyl, and their corresponding branched chain isomers. Further, such monovalent hydrocarbon substituents can be aralkyl radicals such as, for example, benzyl, α-phenylethyl, β-phenylpropyl, γ-phenylpropyl, β-phenylisopropyl, α-phenylbutyl, γ-phenylbutyl, and the like, and α'-naphthyl-methyl, α-(α'naphthyl)-ethyl, α-(β'-naphthyl)-ethyl, and the like, and their corresponding positional isomers. Moreover, the univalent aliphatic radical or radicals can be aralkenyl radicals such as, for example, α-phenyl ethenyl, α-phenyl-$\Delta^1$-propenyl, β-phenyl-$\Delta^1$-propenyl, α-phenyl-$\Delta^2$-propenyl, α-phenylisopropenyl, β-phenylisopropenyl, and similarly, the phenyl derivatives of the isomers of butenyl, pentenyl, and the like. Other such aryl alkenyls include α-(α'-naphthyl)-ethenyl, β-(α'-naphthyl)-ethenyl, α-(β'-naphthyl)-$\Delta^1$-propenyl, β-(β'-naphthyl)-$\Delta^1$-propenyl, α-(β'-naphthyl)-$\Delta^2$-propenyl, α-(α'-naphthyl)-isopropenyl, and the like.

When the monovalent hydrocarbon radical is a univalent alicyclic radical or radicals, these can be selected from the group consisting of cycloalkyl and cycloalkenyl radicals. Thus, for example, they can be the cycloalkyl radicals, cyclopropyl, cyclobutyl, cycloamyl, cyclohexyl, and the like, and such cycloaliphatic radicals as α-cyclopropylethyl, β-cyclobutylpropyl, and the like. Similarly, the alicyclic radicals can be cycloalkenyl radicals such as, for example, α-cyclohexyl ethenyl, α-cycloheptyl-$\Delta^1$-propenyl, β-cyclooctyl-$\Delta^2$-propenyl, β-cyclononyl isopropenyl, and the like. When the monovalent hydrocarbon radical is a univalent aromatic radical or radicals, these can be selected from the group consisting of aryl and alkaryl radicals; for example, aryl radicals such as phenyl, α-naphthyl, β-anthryl, and the like. Moreover, the univalent aromatic radical can be alkaryl radicals such as, for example, o-tolyl; 2,3-xylyl; 2,4-xylyl; 2,6-xylyl; and the like, or o-ethylphenyl, p-ethylphenyl, 2-methyl-α-naphthyl, 4-methyl-α-naphthyl, 7-methyl-α-naphthyl, and the like.

It is to be understood that the foregoing examples of the radicals R and R' are presented as illustrations and other examples will be evident. Further, these radicals can be substituted with other constituents provided they are inert to the reactants as, for example, ether linkages.

The constituents M and M' in the above formulae can be the same or different and are monovalent or polyvalent metallic ions. We particularly prefer the alkali and alkaline earth metals, especially sodium, although other metals can be employed. In general, any metallic ion can be employed which has a valence of 1 to 4 inclusive. Thus, as pointed out above, the subscripts $u$, $v$, $w$, $x$, $y$, and $z$ can be the same or different and are small whole numbers of 1 to 4 inclusive. In other words, these numerals will correspond to that required for particular chemical combination of M and M' with the ionic structure:

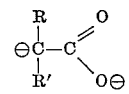

As typical examples of the constituents M and M', sodium, potassium, and the like alkali metals, and calcium, barium, strontium, and the like alkaline earth metals can be mentioned. Likewise, the constituents M and M' can be such metals as, for example, aluminum, cadmium, cerium, chromium, copper, iron, lead, nickel, zinc, and other metals having a valence of 1 to 4 inclusive. It is preferred that the constituent M of Formula II be the alkali or alkaline earth metals, primarily because of their greater availability and reactivity. Thus, in this respect, sodium has been found to be particularly suitable.

The metal substituent of the metal hydrides employed as a reactant in this invention conforms to the definition of M defined hereinbefore. Thus, exemplary of other metallic hydrides which can be employed in place of sodium hydride in the foregoing examples are potassium hydride, rubidium hydride, cesium hydride, magnesium hydride, calcium hydride, lithium hydride, barium hydride, aluminium hydride, and the like.

The constituents $a$ and $b$ can be the same or different and are selected from the group consisting of hydrogen and lower alkyl radicals. These metal amide derivatives are readily prepared by reacting an amine with the metal in the presence of a conjugated polyene. For example, N-sodium propyl amide is prepared by reacting n-propyl amine with finely divided sodium in the presence of butadiene. In general, it is preferred to employ lower alkyl radicals which form an amine derivative in the reaction which boils at about 100° C. or less and is relatively stable under reaction conditions. Thus, for example, $a$ or $b$ can be the radicals methyl, ethyl, isopropyl, propyl, and the like. The use of the metal amides or the substituted metal amides which will result in a derivative having a boiling point below about 100° C. and is comparatively stable under reaction conditions is preferred since the derivative can be readily removed from the reaction mixture rapidly. Rapid removal of the derivative maintains the course of the reaction toward the formation of the metallo-metallic organic salt.

In general, we conduct our process at a temperature sufficient to initiate reaction. It is preferred to conduct the reaction at a temperature within about 40° C. of the melting point of the lower melting reaction when a metal amide is employed. The reaction is conducted up to about 260° C. with a metal hydride—preferably 180°–260° C. In some cases it is desirable to employ temperatures approaching the decomposition temperature of the product produced. This is especially true in the case where a metal hydride is employed as a reactant. When a metal amide or derivative thereof is employed, best results are obtained when the reaction is conducted at temperatures below about 250° C.—generally between about 170°–250° C. Temperatures substantially above 250° C. are not desired in that side reactions will take place, thus decreasing the yield. In certain instances, melting point depressants can be employed thus permitting conducting the reaction with metal amides at even lower temperatures. For example, when sodium amide is to be reacted with sodium acetate, the desirable amount of sodium hydroxide can be mixed with the sodium amide thus decreasing its melting point considerably and permitting conductance of the reaction at a lower temperature. In this instance, temperatures considerably below the melting point of the lower melting reactant can be employed. Other melting point depressants which can be employed are the halides of the metals. Still other melting point depressants will be evident to those skilled in the art.

From the foregoing discussion of melting point depressants it becomes evident that when employing a metallic amide or derivative of a metallic amide it is very desirable to conduct the reaction at a temperature so as to render the metallic amide reactant in a fused state. It has been found that conducting the process of this invention with the amide reactant in such a fused state gives better yields and shorter reaction rates than when the reaction is conducted in the non-fused condition. In the case of metal hydrides which have high melting points which are generally above the decomposition temperature of the other reactants and product produced it is not feasible to run the reaction in such a fused state. Thus, in the case of metallic hydrides the reaction is run in the dry state—that is, a non-fused state. It is for this reason that it is generally desirable to employ higher temperatures when conducting the reaction with a metal hydride reactant, i.e. temperatures between the decomposition temperature of the product produced and 20° less than said decomposition temperature. For example, when reacting sodium and sodium acetate in a stirred reaction vessel in the presence of a hydrogen flush best results are obtained at temperatures between about 260° to 280° C.

An excess of either reactant can be employed. However, if an excess of one of the reactants is employed, it is preferable that the metallic salt of the organic acid be in excess so that the metal amide or hydride will be essentially quantitatively consumed. In this manner, the product obtained may contain some metal salt of organic acids, but this impurity has not been found detrimental in subsequent use of the α-metallo-metallic salts of organic acids. In an especially preferred embodiment, essentially stoichiometric quantities of the reactants are employed.

The particle size of the reactants is important. In general, it is preferred to employ particle sizes below about 50 microns. The smaller the particle size, the more intimate contact obtained between the reactants and shorter reaction periods are required. As noted previously, the reactants are premixed and fed continuously to a heated surface. Although not required, this is the preferable operation since more efficient comminution of the reactants is obtained. Generally, however, when a metallic hydride is employed the reactants are contacted in a reaction vessel and heat applied. It should be understood that the reactants need not be pre-ground or premixed, but can be fed to the reactor separately in larger particle sizes and mixed and ground in situ. This is particularly true when the agitation provided in the reactor is of the type to provide grinding of the reaction mixture during the course of the reaction. Employing the technique of the grinding along with the agitation enhances the contact between the reactants, thus providing more complete reaction. One suitable method of obtaining this objective is to employ a ball mill as a reactor. Other apparatus can be employed which will be evident to those skilled in the art.

The reaction should be conducted in an inert atmosphere such as argon, nitrogen, krypton, and the like. It is preferable that the inert atmosphere be pre-purified so as to be substantially free of impurities such as oxygen and moisture, since these impurities may be taken up in the product. Although when a metallic hydride is employed the reaction is generally run in the dry state as described hereinbefore for some purposes it is desirable to conduct the reaction under an inert liquid blanket. One of the purposes of such an embodiment is to avoid oxygen contamination by impurities in the flushing gas. Another reason is that this inert blanket acts as a solvent for hydrogen or ammonia gas when used to produce the catalyst of this invention in situ. The inert liquid blanket employed is generally a high boiling hydrocarbon oil, such as mineral oil.

The reaction is conducted at atmospheric or sub-atmospheric pressures. Sub-atmospheric pressures have the advantage of enhancing removal of the volatile by-product thus obtaining more rapid reaction and more complete shifting of the equilibrium. When a metal hydride is employed, the reaction can be conducted from atmospheric pressure to about 333 atmospheres.

The process of this invention is admirably suited to continuous methods. For example, the reactants separately or together in the proper proportions are continuously ground to desired particle size, transmitted to a heated movable reactor surface, the voltaile by-product is removed and recovered for recycling to the preparation of the metal amide or derivative thereof, and the product is continuously discharged from the reactor. This and other modifications will be evident to those skilled in the art.

Thus, by the process of this invention, when sodium amide or sodium hydride is reacted with sodium propionate, α-sodio-sodium propionate is prepared. Likewise, when potassium-4-methyl caproate is reacted with sodium amide or sodium hydride, α-sodio-potassium-4-methyl caproate is produced. In addition, when potassium diethylamide is reacted with sodium vinyl acetate, α-potassio-sodium vinyl acetate is prepared. Furthermore, when lithium phenyl acetate is reacted with sodium ethylmethyl amide, α-sodio-lithium phenyl acetate is produced. Similarly, α-sodio-sodium-2-cyclohexyl acetate is prepared when sodium amide is reacted with sodium-2-cyclohexy acetate. In addition, α-lithio-lithium isobutyrate is obtained when lithium isobutyrate is reacted with lithium amide or lithium hydride. Further, α-sodio-calcium acetate will be prepared when calcium acetate is reacted with sodium dimethyl amide. Similarly, when aluminum acetate is reacted with potassium amide or potassium hydride, α-potassio-aluminum acetate is obtained. As can be seen, various combinations of reactants I and II can be employed to produce III. The foregoing examples are cited merely as illustrations and are not intended to be limitations. That is, other combinations of the radicals, materials, and metals defined previously will be evident to those skilled in the art.

Although it is generally preferred to employ the metal salt of an organic acid, as described hereinabove, it is obvious that the free acid can also be employed to produce the metal salt in situ. Such an embodiment although utilizing two equivalents of metal for each equivalent of metallated product produced nevertheless only employs one equivalent of metal in the metallation of the α-carbon position. This embodiment thus is consistent with the stoichiometry described hereinbefore.

When reacting metallic salts of organic acids with metal hydrides according to this invention, the metallo substituted metallic salts of organic acids as described hereinbefore are obtained essentially free of other organo-metallic compounds. That is, the products as obtained by our process are not contaminated with more than about .5 percent by weight of other organo-metallic compounds. The process of this invention thus provides these products in essentially pure form thereby permitting their utility in a variety of chemical reactions without the hindrance of competing reactions and the formation of impurities in the final products.

Thus, for example, α-sodio-sodium-2-ethyl propionate and α-sodio-sodium-2-methyl butyrate when reacted with carbon dioxide result in substituted malonic acids which are obtained in high purity and yields.

Furthermore, the compounds produced by the process of this invention can be employed in the preparation of salts of organic acids, as, for example, then α-sodio-sodium acetate is reacted with n-octyl bromide as illustrated in the following working example.

*Example XIII*

Into a reaction flask provided with means for heating and refluxing were added 10.4 parts of α-sodio-sodium acetate and 38.6 parts of n-octyl bromide utilizing 50 parts of n-nonane as a diluent. The mixture was externally heated to reflux temperature (about 150° C.) and maintained at this temperature for 6 hours. The solid product formed was then filtered from the reaction mixture. This product consisting essentially of sodium decanoate was dissolved in water and acidified with hydrochloric acid. A yellow oil separated which was extracted three times with ether. Upon evaporation of the ether from the product, decanoic acid having a melting point of 27° C. was recovered in high yield.

Likewise, in Example XIII equally good results are obtained with other products produced by the process of this invention such as α-potassio-potassium acetate, α-calcio-barium acetate, and the like.

Another way in which the compounds produced by the process of this invention find utility is in the manufacture of organic esters as, for example, when an organic monohalide having at least one hydrogen atom on the halogen substituted carbon atom is reacted with a metallo substituted metallic salt of this invention. The following examples more fully illustrate this embodiment.

*Example XIV*

Into a reaction vessel provided with means for heating and containing 104 parts of α-sodio-sodium acetate were added 420 parts of benzyl chloride. This mixture was then heated to 60° C. Vigorous reaction took place which was completed within a few minutes concurrently with a temperature rise. The reaction mass became nearly solid. The product upon cooling to room temperature was filtered and the solids washed with hexane. The filtrate was vacuum distilled to remove benzyl chloride and a fraction boiling at 240° C. at 14 millimeters of mercury was collected. This fraction was redistilled at atmospheric pressure and a fraction boiling between 310–340° C. was analyzed and found to contain 81.6 percent carbon, 6.7 percent hydrogen, no nitrogen and less than one percent chlorine which compares with the benzyl ester of phenyl propionic acid which has 80.2 percent carbon and 6.7 percent hydrogen.

*Example XV*

By reacting 160 parts of α-sodio-sodium caproate with 253 parts of benzyl chloride at 100° C. as in the preceding example the benzyl ester of β-butyl phenyl propionic acid is obtained.

Furthermore, the compounds produced by the process of this invention can be utilized in the preparation of thio acids by the reaction of a metallo-substituted metallic salt of an organic acid with sulfur employing temperatures of at least about 100° C. A preferred example of this utility is the reaction of 60.3 parts of α-sodio-sodium acetate with 32 parts of sulfur employing a toluene solvent and reflux temperatures.

Having thus described the novel process of this invention, it is not intended that it be limited except as noted in the appended claims.

We claim:

1. The process which comprises reacting a metal salt of a carboxylic acid, having at least one α-hydrogen atom, with a compound selected from the group consisting of hydrides, amides, and lower alkyl amides of a metal selected from the class consisting of alkali and alkaline earth metals (1) at a pressure not substantially greater than atmospheric and at a temperature within about 40° C. of the melting point of the lower melting reactant when said amides and lower alkyl amides are employed, and (2) when said hydrides are employed, said process being conducted at a temperature up to about 260° C.

2. The process of claim 1 wherein said compound is a metal amide and said process is conducted at a temperature between about 170 and 250° C.

3. The process of claim 1 wherein said compound is a metal hydride and said process is conducted at a temperature between about 180 and 260° C.

4. The process of claim 1 wherein the metal of said metal salt of a carboxylic acid is selected from the group consisting of alkali and alkaline earth metals.

5. The process which comprises reacting a metal salt of a carboxylic acid, having at least one α-hydrogen atom, with a metal amide of a metal selected from the class consisting of alkali and alkaline earth metals at a pressure not substantially greater than atmospheric and a temperature between about 170 and 250° C., and wherein the metal substituent of said metal salt of a carboxylic acid is selected from the group consisting of alkali and alkaline earth metals.

6. The process of claim 5 wherein said amide is sodium amide.

7. The process which comprises reacting a metal salt of a carboxylic acid, having at least one α-hydrogen atom, with a metal hydride of a metal selected from the class consisting of alkali and alkaline earth metals at a pressure between about atmospheric and 333 atmospheres and a temperature between about 180° and 260° C., and wherein the metal substituent of said metal salt of a carboxylic acid is selected from the class consisting of alkali and alkaline earth metals.

8. The process of claim 7 wherein said hydride is sodium hydride.

9. A process for the preparation of α-sodio-sodium acetate comprising reacting sodium acetate with sodium amide at a pressure not substantially greater than atmospheric and a temperature within about 40° C. of the melting point of the lower melting reactant, but below about 250° C.

10. A process for the preparation of α-sodio-sodium acetate which comprises reacting sodium acetate with sodium amide in essentially stoichiometric amounts at a temperature between about 178° and 220° C. and a pressure not substantially greater than atmospheric.

11. A process for the preparation of α-sodio-sodium acetate which comprises reacting sodium acetate with sodium hydride in essentially stoichiometric amounts at a temperature between about 215° and 239° C. and a pressure not substantially greater than atmospheric.

No references cited.